US012647328B2

(12) United States Patent
Taylor

(10) Patent No.: US 12,647,328 B2
(45) Date of Patent: Jun. 2, 2026

(54) METHODS AND SYSTEMS FOR GENERATING A VIRTUAL GRAPH OF MULTI CHANNEL COMMUNICATIONS

(71) Applicant: IntelePeer, Centennial, CO (US)

(72) Inventor: Bradley Taylor, Fort Worth, TX (US)

(73) Assignee: IntelePeer, Centennial, CO (US)

( * ) Notice: Subject to any disclaimer, the term of this patent is extended or adjusted under 35 U.S.C. 154(b) by 75 days.

(21) Appl. No.: 17/521,320

(22) Filed: Nov. 8, 2021

(65) Prior Publication Data

US 2023/0147451 A1 May 11, 2023

(51) Int. Cl.
*H04L 41/22* (2022.01)
*H04L 67/50* (2022.01)

(52) U.S. Cl.
CPC ............ *H04L 41/22* (2013.01); *H04L 67/535* (2022.05)

(58) Field of Classification Search
CPC .............................. H04L 41/22; H04L 67/535
USPC ........................................................ 709/223
See application file for complete search history.

(56) References Cited

U.S. PATENT DOCUMENTS

| | | | | |
|---|---|---|---|---|
| 11,860,760 | B1 * | 1/2024 | Agarwal ............. | G06F 11/3438 |
| 2015/0350443 | A1 * | 12/2015 | Kumar ................ | H04M 3/5183 |
| | | | | 379/265.13 |
| 2016/0205150 | A1 | 7/2016 | Shaheen et al. | |
| 2018/0219897 | A1 | 8/2018 | Muddu et al. | |
| 2019/0116136 | A1 * | 4/2019 | Baudart ............. | H04L 63/1491 |
| 2022/0217236 | A1 * | 7/2022 | Roytblat ............. | H04M 3/4217 |

FOREIGN PATENT DOCUMENTS

WO          2020055321 A1     3/2020

OTHER PUBLICATIONS

J. Jamison and C. Snow, "An architecture for customer experience management based on the Internet of Things," in IBM Journal of Research and Development, vol. 58, No. 5/6, pp. 15:1-15:11, Sep.-Nov. 2014 (Year: 2014).*
R. K. Sankar and A. Krishna, "Customer Requirement Patterns for Software Vendors," 2013 IEEE 16th International Conference on Computational Science and Engineering, Sydney, NSW, Australia, 2013, pp. 508-514 (Year: 2013).*
I. Benzarti, H. Mili and R. M. de Carvalho, "Modeling and Personalising the Customer Journey: The Case for Case Management," 2021 IEEE 25th International Enterprise Distributed Object Computing Conference (EDOC), Gold Coast, Australia, 2021, pp. 82-91 (Year: 2021).*

(Continued)

*Primary Examiner* — Taylor A Elfervig
(74) *Attorney, Agent, or Firm* — Perkins Coie LLP

(57) ABSTRACT

A technique is directed to methods and systems for generating a virtual graph of multi-channel communications. In some implementations, a virtual graph system provides a virtual graph relationship that manages the representation and captures the information associated with multi-channel communications, such as communications of a user with a corporate contact center. The information can include session and "customer journey" characteristics of the interaction flow beyond the details of the telecommunication infrastructure. Additionally, the virtual graph system can provide a visualization that communicates both historical details and actionable information found in the interaction graph(s).

18 Claims, 9 Drawing Sheets

(56)        References Cited

OTHER PUBLICATIONS

A. Mockus, Ping Zhang and P. L. Li, "Predictors of customer
perceived software quality," Proceedings. 27th International Con-
ference on Software Engineering, 2005. ICSE 2005., St. Louis, MO,
USA, 2005, pp. 225-233 (Year: 2005).*
Braun et al., "Scalable Inference of Customer Similarities from
Interactions Data using Dirichlet Processes", Marketing Science,
Arxiv, p. 1-40, 2010 (Year: 2010).*
International Application No. PCT/US22/48845, International Search
Report and The Written Opinion dated Feb. 9, 2023, 11 pages.

* cited by examiner

100

200

400

Start

402

Ingress/egress of a communication

404

Identify a target

406

Signal/audio decomposition

408

Convert items to metadata

410

Add metadata to the session data

412

Upload file with tagging to NLU/ language analytics platform

414

Apply NLU/language analytics

416

Receive customer provided storage

418

Compare results

420

Analyze data from variety of input sources

End

Bar Chart

Graphical and dashboards views 501

KPIs 503

Flow details 502

Call Drop out Warning!

Anomaly detection and recommendation
504

500

Interaction details and outcomes
505

550

600

800

METHODS AND SYSTEMS FOR GENERATING A VIRTUAL GRAPH OF MULTI CHANNEL COMMUNICATIONS

BACKGROUND

Users, even if they are telecommunications professionals, often hang onto traditional archetypes and analog frames of reference that sometimes cause them to miss the rich dimensions of multi-channel communications in today's digital network infrastructure. For example, often the links between the nodes in a service are referred to as "circuits", even though the simple analog signal has been replaced by packets capable of richer data organization of omni-channel communications. And yet, most often, a linear representation is the oversimple conception of the extensive digital information contained there.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Aspects of the present disclosure are directed to methods and systems for generating a virtual graph of multi-channel communications. A virtual graph system provides a virtual graph relationship that manages the representation and captures the information associated with multi-channel communications, such as communications of a user with a corporate contact center. The information can include session and "customer journey" characteristics of the interaction flow beyond the details of the telecommunication infrastructure. Additionally, the virtual graph system can provide a visualization that communicates both historical details and actionable information found in the interaction graph(s).

The elements of the omni-channel interactions following the instance of one or more graphs can have the associated data organized in an object representation of the nodes, links and related variables representing characteristics of the flow. The object representation can be interrogated both by predefined and unstructured associations, and used to follow both interaction and time-series representations. The virtual graph system can determine the structure of the virtual graph(s), objects and metadata, representing either a single interaction or a group of interactions. The virtual graph system can determine the structure using a visual omni-channel flow builder associated a Communication Platform as a Service (CPaaS) to match the business goals for the interactions. The virtual graph system can derive the virtual graph(s) and associated characteristics from data harvested from data sources describing the interaction(s). In some implementations, the virtual graph system determines the virtual graph(s) and associated characteristics with an adaptive approach that leverages analytics and machine learning techniques.

Conventional session initiation protocol (SIP), private branch exchange (PBX), and CPaaS systems are focused on voice delivery or network efficiency. Methods and systems disclosed herein can provide technical advantages over conventional systems and provide a comprehensive treatment of the digital content as a rich source for the creation of streams and collections data. The disclosed system can evaluate, enrich the data, and deploy in the service of analytics (e.g., AI/ML, natural language processing (NLP), natural language understanding (NLU), etc.) an effective use of voice services. For example the disclosed virtual graph system is a distributed management framework solution deploying the capabilities of: 1) allowing for ingestion of either text and/or audio; 2) allowing for use of any NLU/NLP vendor or open-source software; 3) allowing for enrichment of metadata from any desired source; 4) allowing for flexibility of deployment architecture; 5) creating a self-sustaining training model; 6) and/or creating a comparative test across any NLU/NLP vendor or open-source software.

Figure 1:
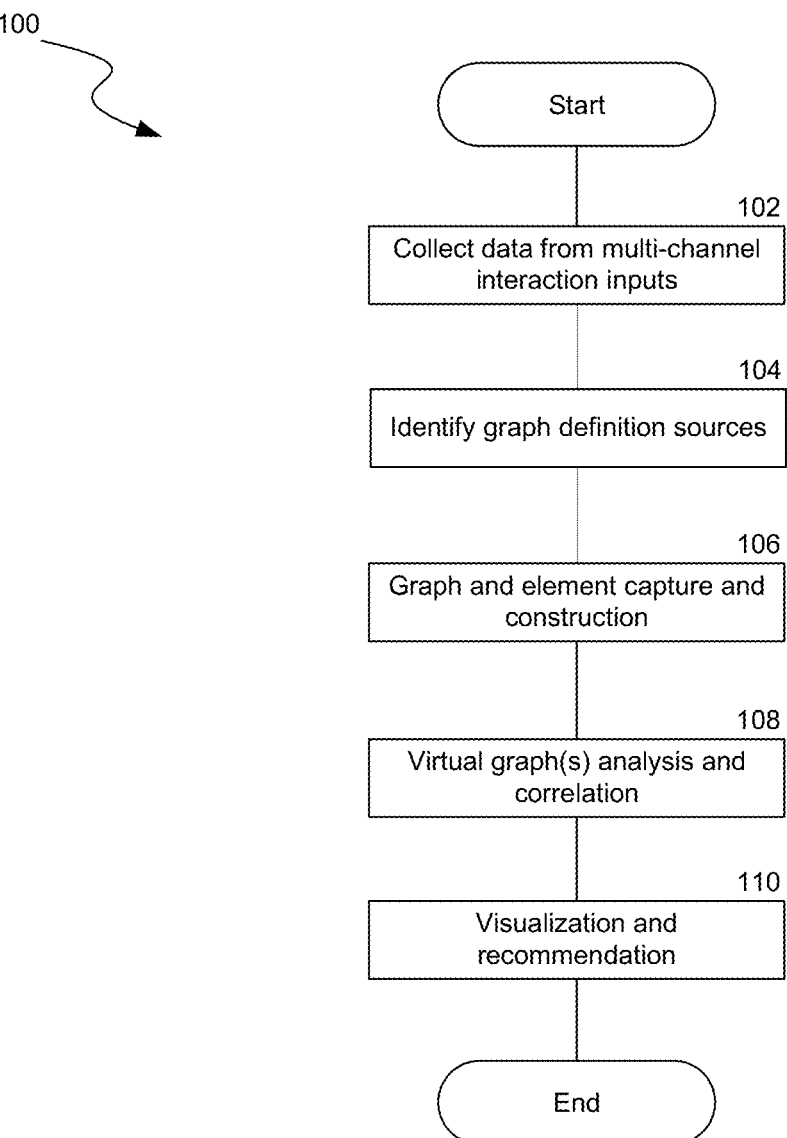
FIG. 1 is a flow diagram illustrating a process used in some implementations for generating a virtual graph of multi-channel communications.

Several implementations are discussed below in more detail in reference to the figures. FIG. 1 is a flow diagram illustrating a process 100 used in some implementations for generating a virtual graph of multi-channel communications. In an embodiment, process 100 is triggered by an omni-channel or multi-channel communication. In various implementations, process 100 can be performed locally on the user device or performed by cloud-based device(s) that can support graphing multi-channel interaction data.

At step 102, process 100 collects data of user interactions from multi-channel interaction inputs. The multi-channel interaction inputs can include public switch telephone network (PSTN), SIP, signaling, SMS, social media, web-bots, web pages, voice (e.g., NLP-tonality, NLP-automatic speech recognition (ASR), interactive voice response (IVR), etc.), automatic call distribution (ACD), or third-party sources.

At step 104, process 100 identifies graph definition sources. The graph definition sources can include derived sources constructed from input data, an adapted combination of derived and designed sources, or designed sources (e.g., interactions design in a visual tool).

At step 106, process 100 performs graph and element capture and construction. Process 100 performs identification of graph and channel deltas, classification of nodes, classification of links, derivation of attributes, analysis of historical time series metrics, and construction of attributes in element capture prior to analysis and correlation. Process 100 can capture and use each element of the graph, the attributes of the elements, and the interactions between the elements representing the walking of the graph in the creation and representation of the interaction flow. Process 100 can identify each node and link interaction as both a graph, and as a part series of individual flows representing a potentially omni-channel communication session that encompasses one or more distinct graphs. Additional details on graph and element capture and construction are provided below in FIG. 2.

At step 108, process 100 performs virtual graph(s) analysis and correlation. The analysis can include whole interaction (e.g., all included virtual graphs) success/failure analysis, or individual virtual graph success/failure analysis. For an interaction failure, process 100 can determine if the failure is capacity or constraint driven. Process 100 can use historical behaviour of all metadata, elements, nodes and links in the analysis. Using the network history allows the of assessment of the graph(s) for determination of norms, branch width (e.g., comparative traffic) and probability of occurrence. Although the terminology described herein refers to nodes and links, it is noted that vertices/points or edges/lines are equally applicable, where visual representation is involved.

Process 100 can perform model driven assessment and categorization of attributes and outcomes for interactions and virtual graphs. Process 100 can perform model driven assessment and categorization using success/reward criteria, drop out and behaviour, capacity and containment, clustering, scoring, A/B testing comparison, or other benchmarks or metrics as specified or calculated. Process 100 can imply variable rewards as inputs for completion of known paths with positive or negative outcomes. For example, an outcome would be a session dropout for a channel in either standard or evolving network behaviour, or an outcome that indicates a completed or failed transaction or customer interaction in a contact center. In some implementation cases, a user provides goal settings which process 100 uses for the reward assessment.

Figure 5A:
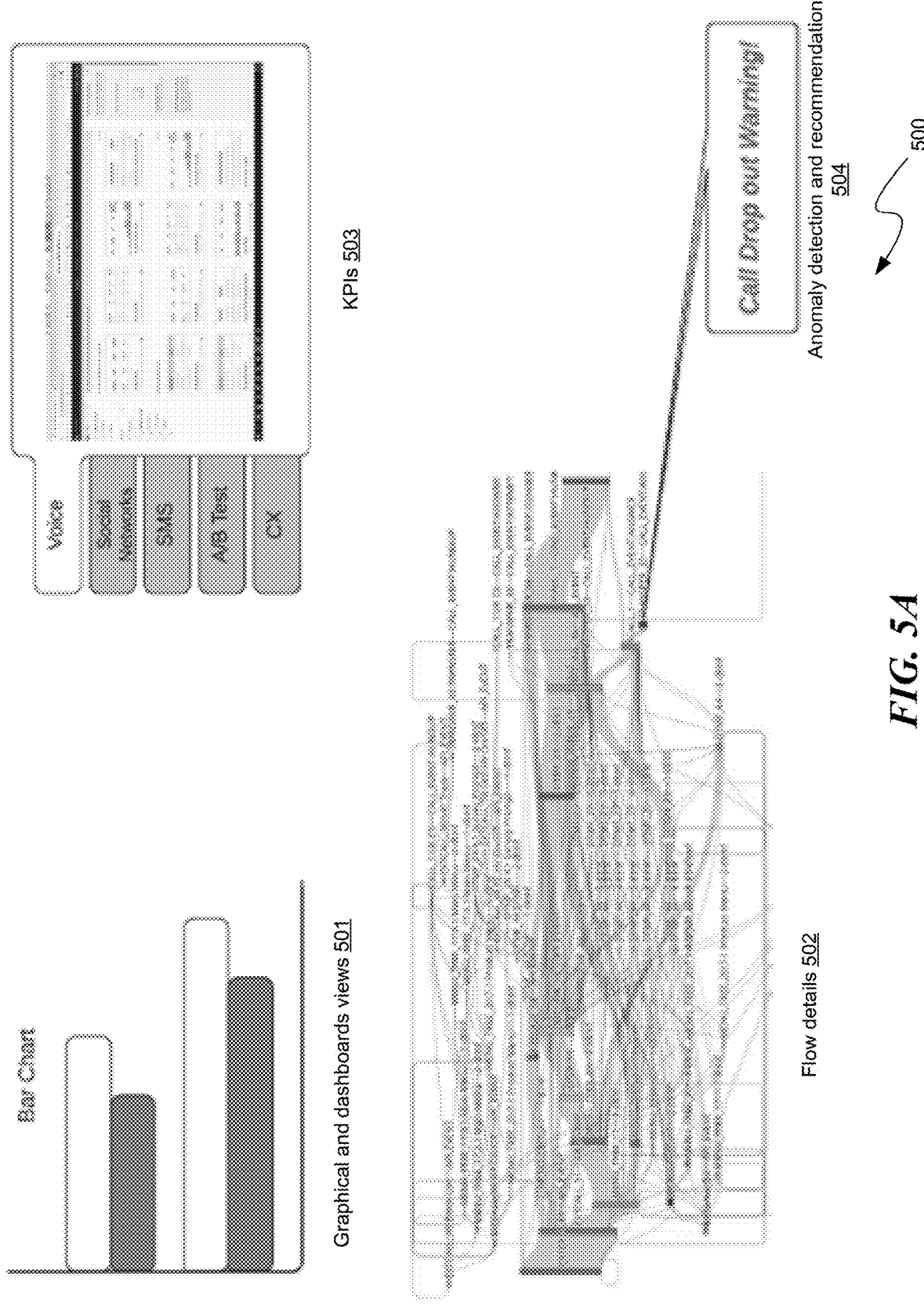
FIG. 5A is an illustration of virtual graphs.
Figure 5B:
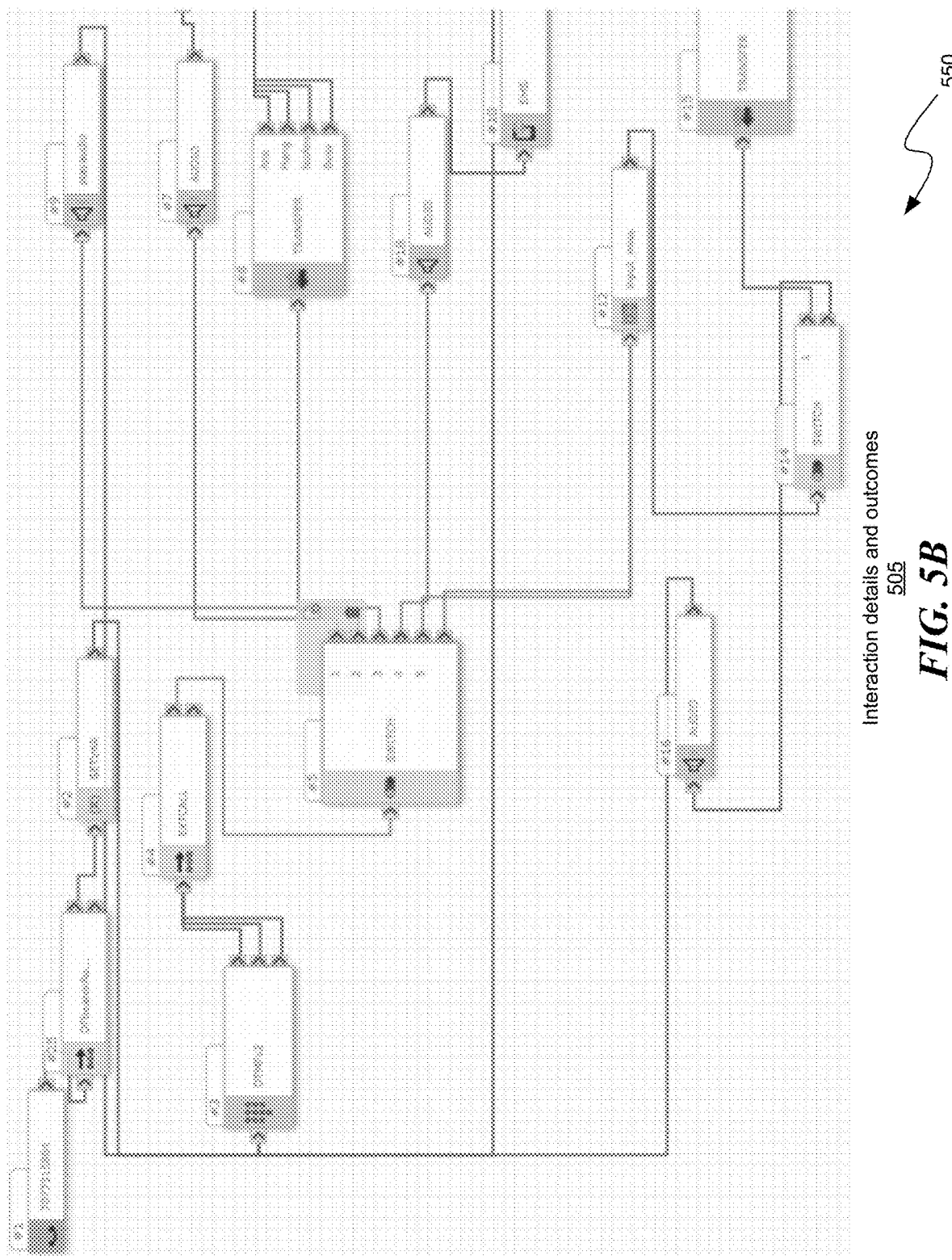
FIG. 5B is an illustration of a virtual graph.

At step 110, process 100 can present a visualization and recommendation for the interactions on a user interface. The visualization can include graphical and dashboard views with flow details, anomaly detection, KPIs, guided recommendations, anomaly highlighting, channel transitions, A/B results, etc. Example 500 of FIG. 5A illustrates a visualization and recommendation of an interaction. FIG. 5A illustrates graphical and dashboard views 501, flow details 502, KPIs 503, and anomaly detection and recommendation 504. Example 550 of FIG. 5B illustrates a visualization and recommendation of an interaction. FIG. 5B illustrates details and outcomes 505 of interactions based on a predefined object representation of nodes and links.

Process 100 can show the underlying information relating to the communication interactions in a set of graphical views. For example, a drag and drop display can define the flow of the interactions, along with the key action and capture characteristics for the nodes and links, that are managing the communication at each decision point in each version of the flow. Upon commitment, a new version of the virtual graph can be persisted. Once communications interactions have begun to run against the virtual graph, process 100 can display the uniquely structured and stored interactions in a variety of views that allow for a user to make actionable inferences from the presentation of the interaction information. For example, a user can look at the interaction progression across many different branches and segments and understand the comparative volume and quality of the interactions (e.g., by using a Sankey diagram graphical representation).

In addition to the actionable decisions from the descriptive chart and diagrammatic representation of the underlying virtual graph, process 100 can provide indications of performance, recommendations for examination for quality of the user experience interaction, and other prescriptive graphical call outs that enable opportunities for improvement of the flow of the multi-channel communication interactions. This is possible in both an individual instance of an end-to-end communication interaction, based on definition of identified customer interaction across channels, a select numeric volume of transactions or interactions, or for a specific time frame. The virtual graph can be used for prediction, A:B testing, or in a filtered assessment using characteristics, such as defining success or failure of node design, impact of a variety of externalities (e.g., mean opinion score (MOS) of line quality), stickiness or channel drop outs, and/or used in guided graphical assessment across many virtual graph views. In some implementations, process 100 can identify additional/updated interaction inputs and return to step 102.

Figure 2:
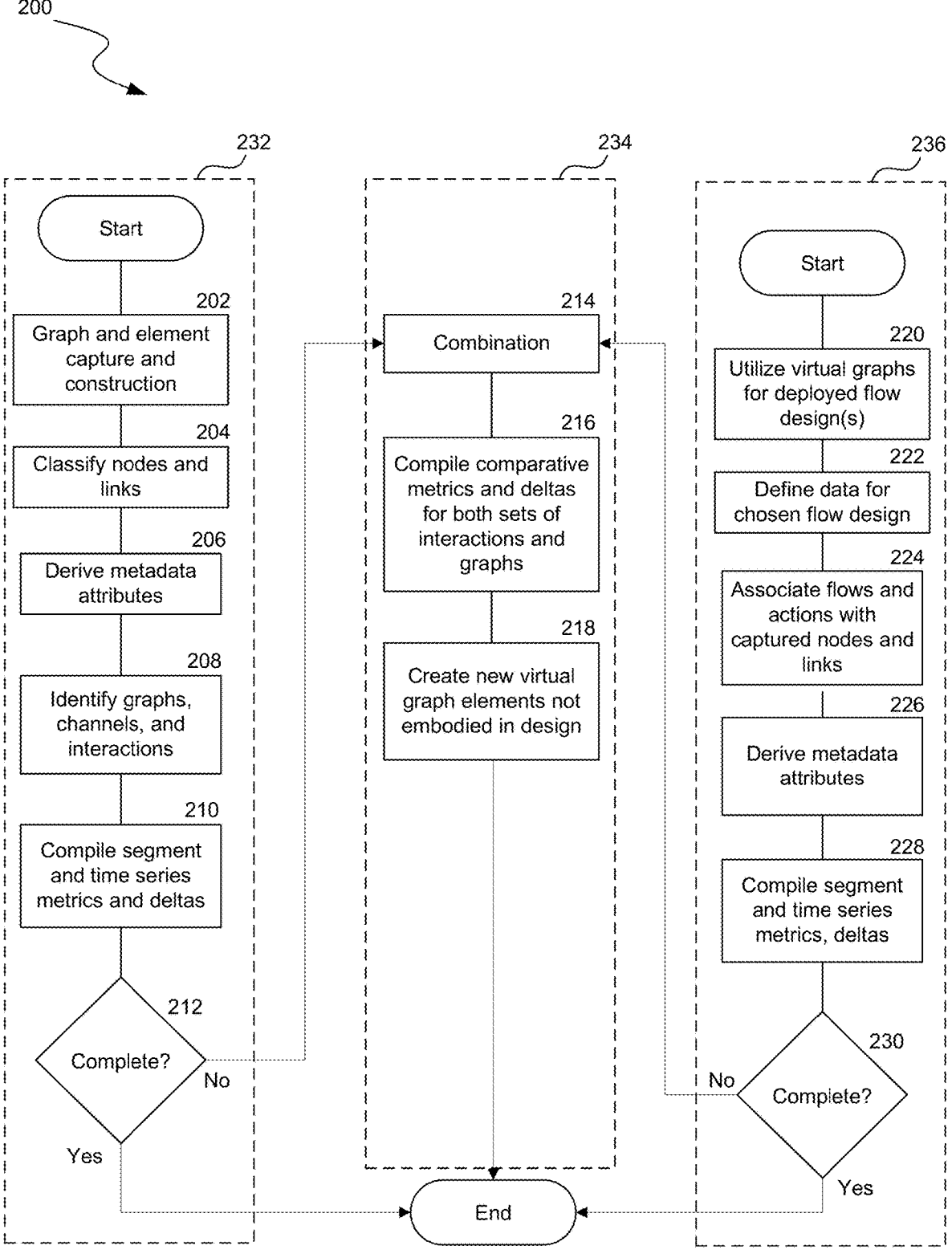
FIG. 2 is a flow diagram illustrating a process used in some implementations for graph and element capture and construction.

FIG. 2 is a flow diagram illustrating a process 200 used in some implementations for graph and element capture and construction. The graph definition sources can include derived sources 232 constructed from input data defining the graph patterns captured during call, SMS, social media interaction or similar data source, an adapted combination 234 of graph patterns derived from input data and designed graph interaction pattern definition sources, or designed graph interaction pattern definition sources only 236 (e.g., interactions design in a visual tool).

At step 202, process 200 performs graph and element capture and construction from derived sources constructed from input data. At step 204, process 200 classifies nodes and links in the graph. At step 206, process 200 derives metadata attributes. At step 208, process 200 identifies graphs, channels, and interactions. At step 210, process 200 compiles segment and time series metrics and deltas. At step 212, process 200 determines whether the graph and element capture, and construction is complete. When process 200 determines the graph and element capture, and construction is not complete, at step 214, process 200 collects data from an adapted combination of derived and designed sources. When process 200 determines the graph and element capture, and construction is complete, process 200 performs virtual graph analysis and correlation as detailed in FIG. 3. At step 216, process 200 compiles comparative metrics and deltas for both sets of interactions and graphs. Process 200 can determine the relevance of a comparison with standardization and normalization.

At step 218, process 200 creates new virtual graph elements not embodied in design. At step 220, process 200 utilizes virtual graphs for deployed flow design(s) from designed sources. At step 222, process 200 defines data for chosen flow designs. At step 224, process 200 associates flows and actions with captured nodes and links. At step 226, process 200 derives metadata attributes. At step 228, process 200 compiles segment and time series metrics and deltas. At step 230, process 200 determines whether the graph and element capture, and construction is complete. When process 200 determines the graph and element capture, and construction is not complete, at step 214, process 200 collects data from an adapted combination of derived and designed sources. When process 200 determines the graph and element capture, and construction is complete, process 200 performs virtual graph analysis and correlation as detailed in FIG. 3.

Figure 3:
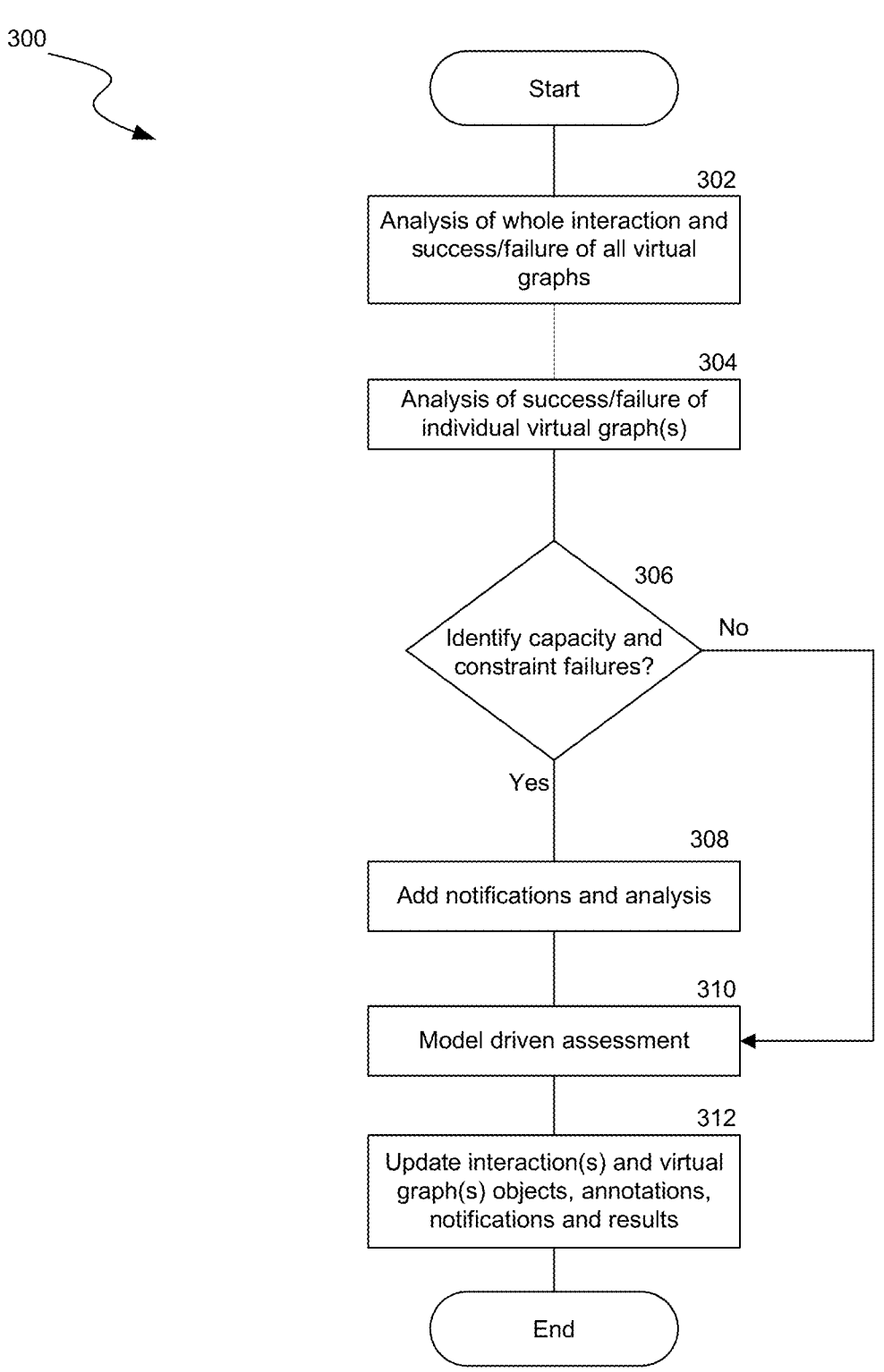
FIG. 3 is a flow diagram illustrating a process used in some implementations for virtual graph analysis and correlation.

FIG. 3 is a flow diagram illustrating a process 200 used in some implementations for virtual graph analysis and correlation. At step 302, process 300 performs analysis of the whole interaction and of the success or failure of all the virtual graphs. For an interaction failure, process 300 can determine if the failure is capacity or constraint driven, or a simple termination of the interaction at the volition of the originator of the interaction. This determination influences any award. At step 304, process 300 performs analysis of the success or failure of each individual virtual graph. For an interaction failure, process 300 can determine if the failure is capacity or constraint driven, or a simple termination of the interaction at the volition of the originator of the inter-action.

At step 306, process 300 uses heuristics to identify capacity and constraint failures. When process 300 identifies capacity and constraint failures, at step 308, process 300 adds notifications and analysis to the virtual graphs. When success is explicitly identified has having occurred in pro-cess 300, for example in step 302 and/or step 304, or when process 300 does not identify capacity and constraint fail-ures, at step 310, process 300 performs a model driven assessment and categorization of attributes and outcomes for interactions and virtual graphs. The assessment and classi-fication can include clustering, scoring, A/B testing com-parison, other benchmarks or metrics as specified or calcu-lated. At step 312, process 300 updates interaction and virtual graph objects, annotations, notifications, and results.

Figure 4:
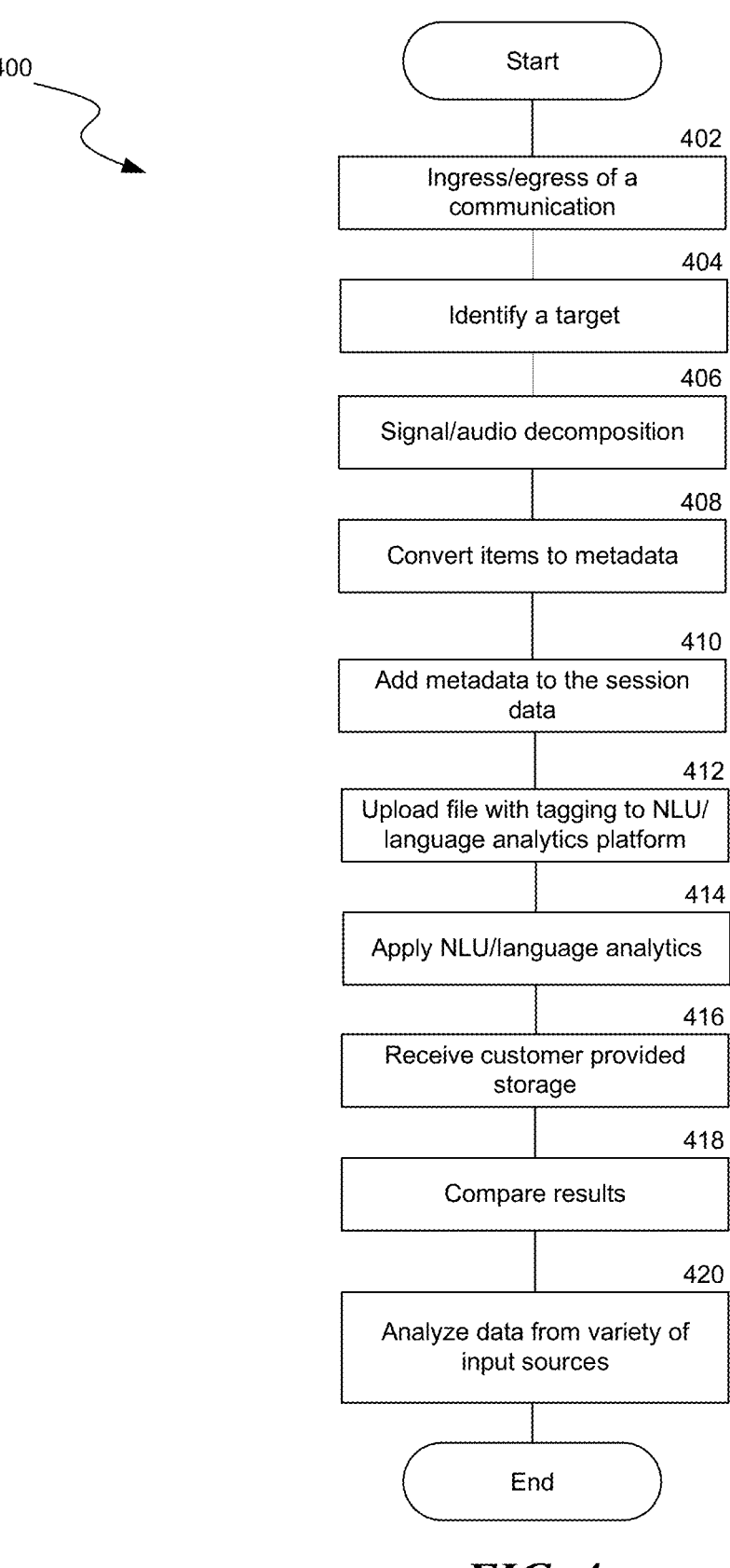
FIG. 4 is a flow diagram illustrating a process used in some implementations for generating a virtual graph of multi-channel communications.

FIG. 4 is a flow diagram illustrating a process 400 used in some implementations for generating a virtual graph of multi-channel communications. At step 402, process 400 detects an ingress/egress of a communication via a session border controller (SBC), or in some implementations from another multi-channel communication providing a digital interaction bearing voice, textual, or graphical (image or emoji) communication. At step 404, process 400 identifies, in one implementation, using configurations in a network distribution switch to define the signal characteristics of the interactions virtual graph, specifically that the interaction is to have SIP and Real Time Transport (RTP) mirrored to the decomposition station. At step 406, process 400 performs signal/audio decomposition at the decomposition station. At the decomposition station process 400 can identify indi-vidual calls, use the session ID of the call to name the subsequent files, or segment out the call signaling and save it as a file (e.g., JSON file). Process 400 can segment out the RTP and save it in a designated format (e.g., ".au" format so the audio can be sent to internal NLU systems).

At step 408, process 400 converts items in the signaling stream to metadata. Process 400 can save as metadata identified items for both signaling and audio sessions. At step 410, process 400 adds metadata (e.g., metadata for enrichment needs) offered by users, such as a customer or third party, onto the session data. At step 412, process 400 uploads the audio file for the session (e.g., enriched with the metadata) to an NLU/language analytics platform with tag-ging specific to the platform. At step 414, process 400 applies NLU/Language analytics to the uploaded session and stores the results into a "cloud" (e.g., Google™, AWS™, IBM™, etc.) and analyzes the results at a single or multi session level.

At step 416, process 400 receives user-provided (e.g., customer, third party, etc.) storage (public or private) for post enriched data invariant of the platform selected. At step 418, process 400 performs comparisons of the results against all platforms in use to gauge performance and train models/services (e.g., internal systems such as BERT, SpaCy, Kaladi (NLU and NLP) gain training and hardening) in use. At step 420, process 400 analyses data from a variety of input sources (e.g., sources such as, text, SMS, web chat, or other modalities of communication, which are added to a communications-platforms-as-a-service (CPaaS)) and scans the speech-to-text portion of the data. Process 400 can merge the speech-to-text portion of the data with audio data when the session takes place across a variety of communication interfaces.

Figure 6:
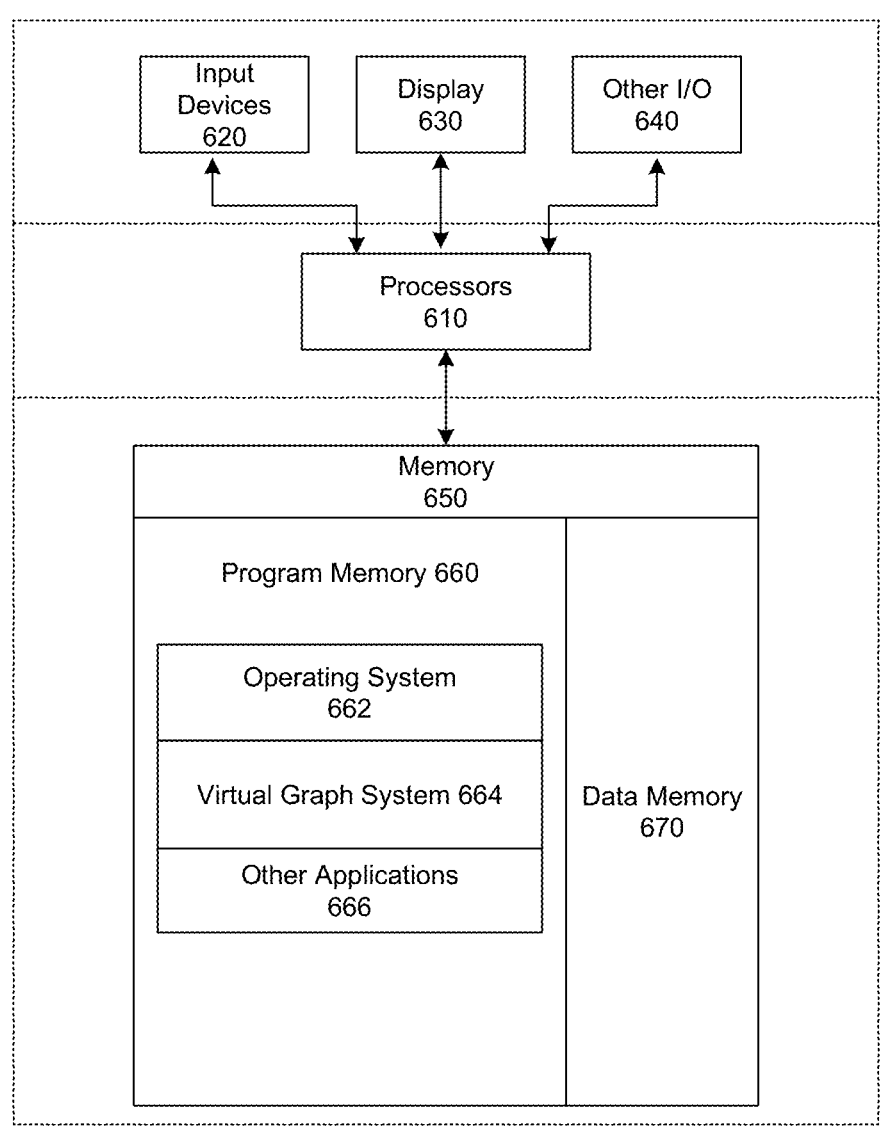
FIG. 6 is a block diagram illustrating an overview of devices on which some implementations can operate.

FIG. 6 is a block diagram illustrating an overview of devices on which some implementations of the disclosed technology can operate. The devices can comprise hardware components of a device 600 that manage entitlements within a real-time telemetry system. Device 600 can include one or more input devices 620 that provide input to the processor(s) 610 (e.g. CPU(s), GPU(s), HPU(s), etc.), notifying it of actions. The actions can be mediated by a hardware con-troller that interprets the signals received from the input device and communicates the information to the processors 610 using a communication protocol. Input devices 620 include, for example, a mouse, a keyboard, a touchscreen, an infrared sensor, a touchpad, a wearable input device, a camera- or image-based input device, a microphone, or other user input devices.

Processors 610 can be a single processing unit or multiple processing units in a device or distributed across multiple devices. Processors 610 can be coupled to other hardware devices, for example, with the use of a bus, such as a PCI bus or SCSI bus. The processors 610 can communicate with a hardware controller for devices, such as for a display 630. Display 630 can be used to display text and graphics. In some implementations, display 630 provides graphical and textual visual feedback to a user. In some implementations, display 630 includes the input device as part of the display, such as when the input device is a touchscreen or is equipped with an eye direction monitoring system. In some imple-mentations, the display is separate from the input device. Examples of display devices are: an LCD display screen, an LED display screen, a projected, holographic, or augmented reality display (such as a heads-up display device or a head-mounted device), and so on. Other I/O devices 640 can also be coupled to the processor, such as a network card, video card, audio card, USB, firewire or other external device, camera, printer, speakers, CD-ROM drive, DVD drive, disk drive, or Blu-Ray device.

In some implementations, the device 600 also includes a communication device capable of communicating wirelessly or wire-based with a network node. The communication device can communicate with another device or a server through a network using, for example, TCP/IP protocols. Device 600 can utilize the communication device to distrib-ute operations across multiple network devices.

The processors 610 can have access to a memory 650 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 650 can include program memory 860 that stores programs and software, such as an operating system 662, virtual graph system 664, and other application programs 666. Memory 650 can also include data memory 670, audio data, text data, text to speech data, signal data, storage data, device data, data, machine learning data, artificial intelligence data, metadata, multi-channel interac-tion input data, virtual graph data, interaction data, nodes and link data, NLU/NLP data, management data, notification data, configuration data, settings, user options or preferences, etc., which can be provided to the program memory 660 or any element of the device 600.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 7:
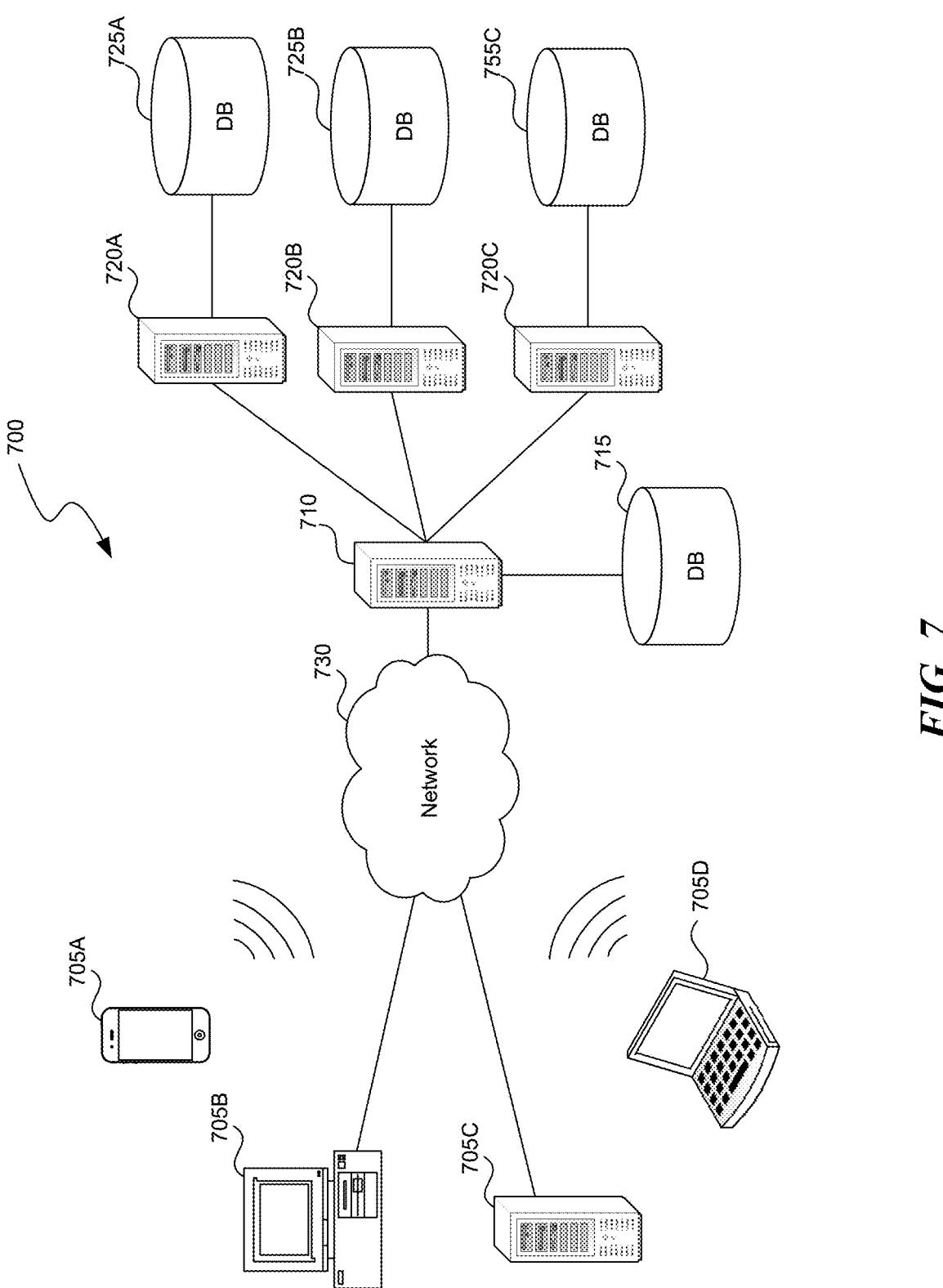
FIG. 7 is a block diagram illustrating an overview of an environment in which some implementations can operate.

FIG. 7 is a block diagram illustrating an overview of an environment 700 in which some implementations of the disclosed technology can operate. Environment 700 can include one or more client computing devices 705A-D, examples of which can include device 600. Client computing devices 705 can operate in a networked environment using logical connections through network 730 to one or more remote computers, such as a server computing device 710.

In some implementations, server 710 can be an edge server which receives client requests and coordinates fulfillment of those requests through other servers, such as servers 720A-C. Server computing devices 710 and 720 can comprise computing systems, such as device 600. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server/client devices. Server 710 can connect to a database 715. Servers 720A-C can each connect to a corresponding database 725A-C. As discussed above, each server 720 can correspond to a group of servers, and each of these servers can share a database or can have their own database. Databases 715 and 725 can warehouse (e.g. store) information such as implement data, audio data, text data, text to speech data, signal data, storage data, device data, data, machine learning data, artificial intelligence data, metadata, multi-channel interaction input data, virtual graph data, interaction data, nodes and link data, NLU/NLP data, management data, notification data, and configuration data. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. Network 730 may be the Internet or some other public or private network. Client computing devices 705 can be connected to network 730 through a network interface, such as by wired or wireless communication. While the connections between server 710 and servers 720 are shown as separate connections, these connections can be any kind of local, wide area, wired, or wireless network, including network 730 or a separate public or private network.

Figure 8:
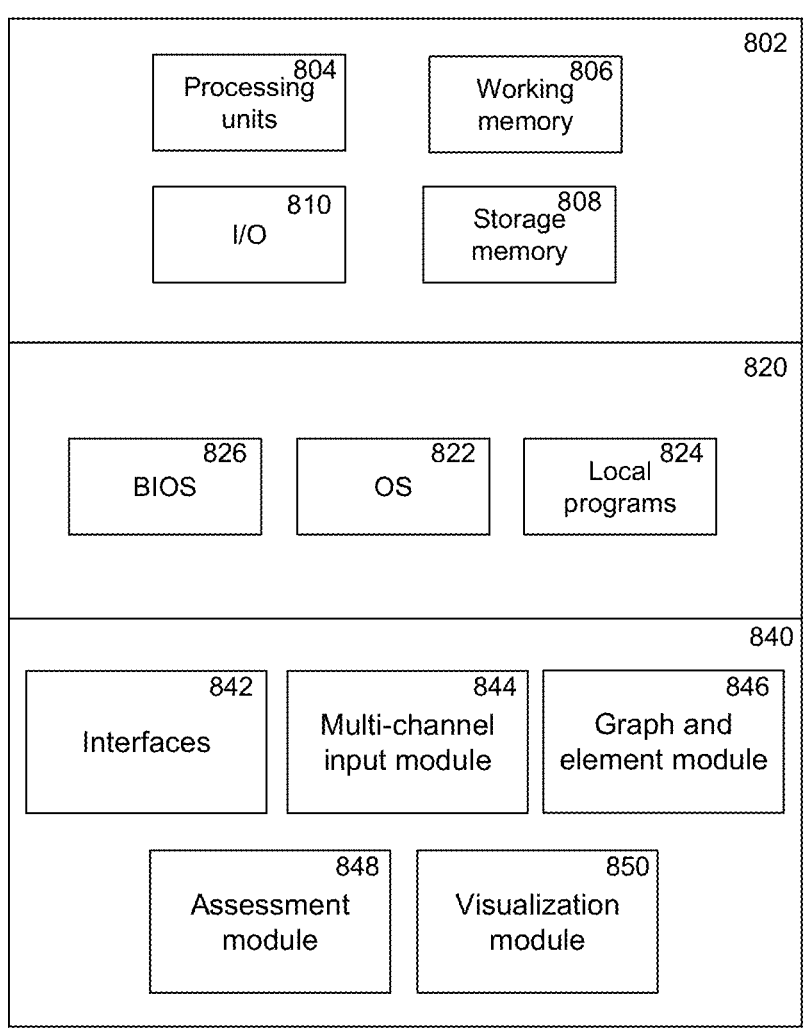
FIG. 8 is a block diagram illustrating components which in some implementations can be used in a system employing the disclosed technology.

FIG. 8 is a block diagram illustrating components 800 which, in some implementations, can be used in a system employing the disclosed technology. The components 800 include hardware 802, general software 820, and specialized components 840. As discussed above, a system implementing the disclosed technology can use various hardware including processing units 804 (e.g. CPUs, GPUs, APUs, etc.), working memory 806, storage memory 808 (local storage or as an interface to remote storage, such as storage 715 or 725), and input and output devices 810. In various implementations, storage memory 808 can be one or more of: local devices, interfaces to remote storage devices, or combinations thereof. For example, storage memory 808 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 715 or storage provided through another server 720). Components 800 can be implemented in a client computing device such as client computing devices 705 or on a server computing device, such as server computing device 710 or 720.

General software 820 can include various applications including an operating system 822, local programs 824, and a basic input output system (BIOS) 826. Specialized components 840 can be subcomponents of a general software application 820, such as local programs 824. Specialized components 840 can include multi-channel input module 844, graph and element module 846, assessment module 848, visualization module 850, and components which can be used for providing user interfaces, transferring data, and controlling the specialized components, such as interfaces 842. In some implementations, components 800 can be in a computing system that is distributed across multiple computing devices or can be an interface to a server-based application executing one or more of specialized components 840. Although depicted as separate components, specialized components 840 may be logical or other nonphysical differentiations of functions and/or may be submodules or code-blocks of one or more applications.

In some embodiments, the multi-channel input module 844 is configured to collects data of user interactions from multi-channel interaction inputs. The multi-channel interaction inputs can include public switch telephone network (PSTN), SIP, signaling, SMS, social media, web-bots, web pages, voice (e.g., NLP-tonality, NLP-automatic speech recognition (ASR), interactive voice response (IVR), etc.), automatic call distribution (ACD), or third-party sources.

In some embodiments, the graph and element module 846 is configured performs graph and element capture and construction. The graph and element module 846 performs identification of graph and channel deltas, classification of nodes, classification of links, derivation of attributes, analysis of historical time series metrics, and construction of attributes in element capture prior to analysis and correlation. The graph and element module 846 can capture and use each element of the graph, the attributes of the elements, and the interactions between the elements representing the walking of the graph in the creation and representation of the interaction flow. The graph and element module 846 can identify each node and link interaction as both a graph, and as a part series of individual flows representing a potentially omni-channel communication session that encompasses one or more distinct graphs In some embodiments, the assessment module 848 is configured to assess and categorize attributes and outcomes for interactions and virtual graphs. The assessment module 848 can perform model driven assessment and categorization using success/reward criteria, drop out and behaviour, capacity and containment, clustering, scoring, A/B testing comparison, or other benchmarks or metrics as specified or calculated. The assessment module 848 can imply variable rewards for completion of known paths with positive or negative outcomes. For example, an outcome would be a session dropout for a channel in either standard or evolving network behaviour.

In some embodiments, the visualization module 850 is configured to present a visualization and recommendation for the interactions on a user interface. The visualization can include graphical and dashboard views with flow details, anomaly detection, KPIs, guided recommendations, anomaly highlighting, channel transitions, A/B results, etc.

Those skilled in the art will appreciate that the components illustrated in FIGS. 6-8 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

Unless explicitly excluded, the use of the singular to describe a component, structure, or operation does not exclude the use of plural such components, structures, or operations. As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

As used herein, the expression "at least one of A, B, and C" is intended to cover all permutations of A, B and C. For example, that expression covers the presentation of at least one A, the presentation of at least one B, the presentation of at least one C, the presentation of at least one A and at least one B, the presentation of at least one A and at least one C, the presentation of at least one B and at least one C, and the presentation of at least one A and at least one B and at least one C.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

I claim:

1. A method for generating a virtual graph of multi-channel communications comprising:

collecting input data of user interactions from at least one multi-channel interaction input;

identifying at least one virtual graph definition source to construct the virtual graph with the input data, wherein the at least one virtual graph definition source is an adapted combination of a derived data source and a designed data source;

compiling comparative metrics and deltas for captured elements from the derived data source and the designed data source;

constructing the virtual graph based on the captured elements in the at least one virtual graph definition source;

identifying a failure of the user interactions in the virtual graph;

receiving data indicating whether the failure of the user interactions results from at least one of a capacity failure or a constraint failure; and displaying, on a user interface:

the virtual graph illustrating the failure of the user interactions during the multi-channel communications, and at least one recommendation for examination of the failure of the user interactions.

2. The method of claim 1, further comprising:

classifying at least one node and at least one link of the virtual graph;

deriving metadata attributes of the input data of the user interactions; and identifying graphs, channels, and the user interactions in the input data.

3. The method of claim 1, further comprising:

adding notifications to the virtual graph to indicate the failure.

4. The method of claim 1, wherein generating the mapping further comprises:

performing a model driven assessment and categorization of attributes and outcomes for the user interactions.

5. The method of claim 1, further comprising:

compiling segment and time series metrics for the input data in the virtual graph.

6. The method of claim 1, wherein the virtual graph includes graphical and dashboard views with flow details and anomaly detection.

7. A computing system comprising:

at least one processor; and at least one memory storing instructions that, when executed by the processor, cause the computing system to perform a process for generating a virtual graph of multi-channel communications, the process comprising:

collecting input data of user interactions from at least one multi-channel interaction input;

identifying at least one virtual graph definition source to construct the virtual graph with the input data, wherein the at least one virtual graph definition source is an adapted combination of a derived data source and a designed data source;

compiling comparative metrics and deltas for captured elements from the derived data source and the designed data source;

constructing the virtual graph based on the captured elements in the at least one virtual graph definition source;

identifying a failure of the user interactions in the virtual graph;

receiving data indicating whether the failure of the user interactions results from at least one of a capacity failure or a constraint failure; and displaying, on a user interface:

the virtual graph illustrating the failure of the user interactions during the multi-channel communications, and at least one recommendation for examination of the failure of the user interactions.

8. The computing system of claim 7, wherein the process further comprises:

classifying at least one node and at least one link of the virtual graph;

deriving metadata attributes of the input data of the user interactions; and identifying graphs, channels, and the user interactions in the input data.

9. The computing system of claim 7, wherein the process further comprises:

adding notifications to the virtual graph to indicate the failure.

10. The computing system of claim 7, wherein the process further comprises:

performing a model driven assessment and categorization of attributes and outcomes for the user interactions.

11. The computing system of claim 7, wherein the process further comprises:

compiling segment and time series metrics for the input data in the virtual graph.

12. The computing system of claim 7, wherein the virtual graph includes graphical and dashboard views with flow details and anomaly detection.

13. A non-transitory computer-readable medium storing instructions that, when executed by a computing system, cause the computing system to perform operations for generating a virtual graph of multi-channel communications, the operations comprising:

collecting input data of user interactions from at least one multi-channel interaction input;

identifying at least one virtual graph definition source to construct the virtual graph with the input data, wherein the at least one virtual graph definition source is an adapted combination of a derived data source and a designed data source;

compiling comparative metrics and deltas for captured elements from the derived data source and the designed data source;

constructing the virtual graph based on the captured elements in the at least one virtual graph definition source;

identifying a failure of the user interactions in the virtual graph;

receiving data indicating whether the failure of the user interactions results from at least one of a capacity failure or a constraint failure; and displaying, on a user interface:

the virtual graph illustrating the failure of the user interactions during the multi-channel communications, and at least one recommendation for examination of the failure of the user interactions.

14. The non-transitory computer-readable medium of claim 13, wherein the operations further comprise:

classifying at least one node and at least one link of the virtual graph;

deriving metadata attributes of the input data of the user interactions; and identifying graphs, channels, and the user interactions in the input data.

15. The non-transitory computer-readable medium of claim 13, wherein the operations further comprise:

adding notifications to the virtual graph to indicate the failure.

16. The non-transitory computer-readable medium of claim 13, wherein the operations further comprise:

performing a model driven assessment and categorization of attributes and outcomes for the user interactions.

17. The non-transitory computer-readable medium of claim 13, wherein the operations further comprise:

compiling segment and time series metrics for the input data in the virtual graph.

18. The non-transitory computer-readable medium of claim 13, wherein the virtual graph includes graphical and dash-board views with flow details and anomaly detection.

\* \* \* \* \*